United States Patent
Doyle et al.

(10) Patent No.: US 9,696,404 B1
(45) Date of Patent: Jul. 4, 2017

(54) REAL-TIME CAMERA TRACKING SYSTEM USING OPTICAL FLOW FEATURE POINTS

(71) Applicant: The United States of America, as represented by the Secretary of the Air Force, Washington, DC (US)

(72) Inventors: Daniel D. Doyle, Wyoming, MI (US); Alan L. Jennings, Sahuarita, AZ (US); Jonathan T. Black, Blacksburg, VA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 250 days.

(21) Appl. No.: 14/705,922

(22) Filed: May 6, 2015

Related U.S. Application Data

(60) Provisional application No. 61/989,098, filed on May 6, 2014.

(51) Int. Cl.
- *H04N 5/225* (2006.01)
- *H04N 5/232* (2006.01)
- *G01S 3/786* (2006.01)

(52) U.S. Cl.
CPC ......... *G01S 3/7864* (2013.01); *H04N 5/2251* (2013.01); *H04N 5/23261* (2013.01)

(58) Field of Classification Search
CPC ............. H04N 5/2251; H04N 5/23261; H04N 5/23238; H04N 5/2259; H04N 5/23248; H04N 5/232; H04N 5/225; G01S 3/7864

(Continued)

(56) References Cited

U.S. PATENT DOCUMENTS

| 4,337,482 A | 6/1982 | Coutta |
| 5,359,363 A | 10/1994 | Kuban |

(Continued)

OTHER PUBLICATIONS

Senior, Acquiring Multi-Scale Images by Pan-Tilt-Zoom Control and Automatic Multi-Camera Calibration, Proceedings of the Seventh IEEE Workshop on Applications of Computer Vision, 2005.
Dawson-Howe, Active surveillance using dynamic background subtraction, Dept. of Computer Science, Trinity College, Dublin. Ireland, Aug. 13, 1996.

(Continued)

*Primary Examiner* — Sherrie Hsia
(74) *Attorney, Agent, or Firm* — AFMCLO/JAZ; Jason Sopko

(57) ABSTRACT

A new apparatus and method for tracking a moving object with a moving camera provides a real-time, narrow field-of-view, high resolution and on target image by combining commanded motion with an optical flow algorithm for deriving motion and classifying background. Commanded motion means that movement of the pan, tilt and zoom (PTZ) unit is "commanded" by a computer, instead of being observed by the camera, so that the pan, tilt and zoom parameters are known, as opposed to having to be determined, significantly reducing the computational requirements for tracking a moving object. The present invention provides a single camera pan and tilt system where the known pan and tilt rotations are used to calculate predicted optical flow points in sequential images, so that resulting apparent movement can be subtracted from the movement determined by an optical flow algorithm to determine actual movement, following by use of a Kalman filter algorithm to predict subsequent locations of a determined moving object and command the pan and tilt unit to point the camera in that direction.

8 Claims, 2 Drawing Sheets

(58) Field of Classification Search
USPC ..... 348/36, 37, 39, 169–172, 208.99, 208.1, 348/208.3, 208.14; 342/75, 76; 340/539.13
See application file for complete search history.

(56) References Cited

U.S. PATENT DOCUMENTS

| | | | |
|---|---|---|---|
| 5,434,617 | A | 7/1995 | Bianchi |
| 6,507,366 | B1 | 1/2003 | Lee |
| 7,256,817 | B2 | 8/2007 | Yata et al. |
| 7,292,265 | B2 | 11/2007 | Kawazoe et al. |
| 7,783,076 | B2 | 8/2010 | Tsunashima |
| 7,936,386 | B2 | 5/2011 | Toya et al. |
| 7,990,417 | B2 | 8/2011 | Yamamoto |
| 8,144,199 | B2 | 3/2012 | Takanaka |
| 2011/0043604 | A1* | 2/2011 | Peleg ............... H04N 5/23238 348/36 |
| 2011/0128385 | A1 | 6/2011 | Bedros et al. |

OTHER PUBLICATIONS

Cucchiara, Advanced Video Surveillance with Pan Tilt Zoom Cameras, University of Modena and Reggio Emilia—Italy, 2006.
Doyle, Optical flow background estimation for real-time pan/tilt camera object tracking, Measurement, Oct. 23, 2013.
Yang, Ptz Camera Based Position Tracking in IP Surveillance System, 3rd International Conference on Sensing Technology, Nov. 30-Dec. 3, 2008.
Araki, Real-Time Tracking of Multiple Moving Object Contours in a Moving Camera Image Sequence, IEEE Trans. Inf. & Syst vol. E83-D, Jul. 2000.
Mian, Realtime Face Detection and Tracking Using a Single Pan, Tilt, Zoom Camera, School of Computer Science and Software Engineering The University of Western Australia, 2008.
Shibata, Target Distance Measurement based on Camera Moving Direction Estimated with Optical Flow, Dept. Electrical and Mechanical Engineering, Seikei University, 2008.
Fry, Tracking of flying insects using pan-tilt cameras, Journal of Neuroscience Methods 101, 2000.

\* cited by examiner

REAL-TIME CAMERA TRACKING SYSTEM USING OPTICAL FLOW FEATURE POINTS

CROSS-REFERENCE TO RELATED APPLICATIONS

This application claims the benefit of the filing date of Provisional Application Ser. No. 61/989,098, filed May 6, 2014, titled "Real-Time Camera Tracking System Using Optical Flow Feature Points," and incorporates its contents by reference into this application.

RIGHTS OF THE GOVERNMENT

The invention described herein can be manufactured and used by or for the U.S. Government for governmental purposes without payment of any royalty.

BACKGROUND OF THE INVENTION

This invention relates generally to real-time camera tracking systems, and more specifically to a single camera tracking system with a controllable pan and tilt mechanism for providing real time, narrow field-of-view, high resolution and on target images.

The use of pan/tilt camera systems with computer vision (CV) techniques is a burgeoning field. Pan/tilt camera systems offer a broader field of view (FOV) for capturing dynamic systems and CV techniques provide a means for automatically detecting objects of interest.

Applying CV and PTZ camera systems for event detection, surveillance and similar functions is the focus of much recent research. There is a continued need to integrate and develop robust, real-time tracking methods using CV techniques with PTZ cameras into other areas such as measurement and navigation. Real-time algorithms are preferred for tracking, but current, although robust, methods of tracking algorithms, despite increasing speed from use of parallel processing techniques, are generally still not sufficiently computationally efficient for truly real-time frame rates.

Prior art single camera systems for tracking moving objects are limited to using a wide field of view, low resolution image in order to successfully track a moving object in real time within the computational speed limitations of currently available commercial camera and computer components.

Tracking, as opposed to using a very wide field of view, low resolution, image, allows for higher resolution images of an object. For example, a tracking system can have the object span 600 pixels of a one megapixel image (1,000 pixels on an edge), but if the object moves 10 times its width, a 9 mega-pixel camera (3,000 pixels on an edge) would only have 300 pixels across the object resulting in half the effective resolution. The larger the span of the object's movement, the more the resolution of a static camera drops. Resolution of a tracking camera would not change based on the span of the object's movement.

Another reason for obtaining higher resolution images of moving objects is for improved post-processing. Lower resolution images degrade post processing performance.

In the early days of photography, a camera needed to be static to obtain clear images. As shutter speeds increased, moving video recorders became feasible and were operated by trained professionals. Training was required so that final videos were high quality in both aesthetic (such as the evocative element of the image) and technical terms (such as framing of a subject and minimal jitter). Current technology ameliorates some of the concerns of an untrained operator, but the general need for live operators is a concern for many applications.

Computer-based tracking uses computer algorithms to automatically process images from a camera to extract useful data. In the simplest sense, a wide-field of view camera can process videos to produce a video tight around an object of interest. This can be done in real-time (while the video is being taken) or by post-processing (any time after the video is captured). If the system is real-time, then data extracted can be used to interact with the object, such as using a pan-tilt unit to track an object of interest.

Many algorithms are based on using a static camera to direct a pan-tilt unit so a separate camera can track an object, or are based on matching a template, describing the object of interest, to a portion of the image. Basing tracking on another camera can result in poor framing of the object in the image because there is no direct feedback to indicate the quality of the images from the tracking camera. If either camera is misaligned, then the system can have a catastrophic failure. Template matching requires a training phase to identify the appearance of an object of interest. If the object changes appearance, such as putting on a ski mask for a facial template; the algorithm may not recognize the appearance as a match.

There are general purpose methods that can locate generic moving objects from a moving camera. These, however, use observed motion rather than commanded motion. When a camera moves, stationary objects will appear to move across the image. Many methods use sequential images to determine an image transform which creates the best match between the images. The disparities between the transformed images represent motion or changes of an object. These methods require that the background is feature rich (as opposed to an untextured wall), and take up the majority of the image, detracting from the objective of having the object fill a plurality of the image. In addition, errors in determining camera motion propagate into error in determining object motion.

Another method uses an inertial sensor to measure rotation, but while the inertial sensor captures a plurality of the motion, it measures acceleration, resulting in inaccuracies and sensor drift. It also performs image stabilization instead of moving object recognition and tracking.

It is clear, therefore, that there is a need for a single camera tracking system that can provide real time, narrow field-of-view, high resolution and on target images.

SUMMARY OF THE INVENTION

The present invention solves the problems of the prior art in tracking a moving object with a moving camera, or similar moving device, by combining commanded motion with optical flow for deriving motion and classifying background.

Commanded motion means that movement of the pan, tilt and zoom (PTZ) unit is "commanded" by a computer so that the pan, tilt and zoom parameters are known, as opposed to having to be observed and calculated, significantly reducing the computational requirements for tracking a moving object.

The known pan and tilt rotations are used to calculate predicted optical flow points in sequential images, so that resulting apparent movement can be subtracted from the movement determined by an optical flow algorithm to determine actual movement, followed by use of a Kalman filter algorithm to predict subsequent locations of a determined moving object and command the pan and tilt unit to point the camera in that direction.

Combining commanded motion for pan and tilt with optical flow allows using a narrow field of view camera providing a high resolution image at acceptably fast frame rates using currently available commercial camera and computer components.

An example embodiment of a PTZ camera for real-time tracking of a moving object according to the teachings of the present invention includes a laptop computer with a separate graphics processing unit, a pan and tilt unit, a CMOS color camera, a lens and a USB to RS-232 communications module for connecting the pan and tilt unit's RS-232 port to a USB port on the computer.

Good feature points, such as strong corners, are determined and used as optical flow points. Knowing the expected pan/tilt motion, optical flow points can be classified as background, moving or noise by eliminating estimated background points. The centroid of the points classified as moving is used for measurement inputs into a Kalman filter for predicting and directing each pan/tilt camera. As the camera tracks an object, the object will stay fixed relative to the camera while the background points will move across the image and eliminated for active target tracking. The results provide real-time tracking on a portable system using pan/tilts for generic moving targets where no training is required. The teachings of the present invention are particularly applicable to applications where the appearance of the moving object is not known in advance.

BRIEF DESCRIPTION OF THE DRAWINGS

The present invention will become more apparent from the following detailed specification and drawings.

DETAILED DESCRIPTION

Figure 1:
FIG. 1 is a schematic view of an example embodiment of a computer vision system according to the teachings of the present invention.

FIG. 1 is a schematic view of an example embodiment of a computer vision system 100 according to the teachings of the present invention.

Computer vision system 100 includes a programmable computer processing unit 110, including a graphics processing unit 120, programmed to control a pan-tilt unit 130 a camera 140 and a lens 150, along with necessary connections and interfaces.

Computer vision system 100 automates a camera and lens to track a moving object. Camera 140 captures and processes images to: (1) detect a moving object's location and direction; and, (2) direct pan-tilt unit 130 holding camera 140 so that the moving object stays in the field of view.

The camera captures images and transfers them to the computing unit. The camera should have sufficient resolution for the task, a high enough shutter speed for crisp images, high enough sensitivity based on the lighting for texture to be apparent, and a frame rate sufficient so that the object does not move too far across the image between images. A prototype uses a 1328x1048 CMOS color camera with variable region of interest for variable resolution. The camera used for the prototype was a Flea-3 (FL3-U3-13S2C-CS) produced by PointGrey Research, Inc. with an attached Fujinon lens.

The pan-tilt unit uses two servos that cause the camera to independently swivel, or rotate, left and right (pan or panoramic rotation) and up and down (tilt). The servos are motors with feedback, so exact positions can be specified. Position is regulated by an internal controller. The controller receives and processes commands from the computing unit. The base of the pan-tilt unit is fixed, so that it does not move relative to the background. The prototype uses a pan-tilt unit rated at 300 deg./sec. with position resolution of 0.05 deg. for loads up to 6 lbs. The prototype unit is a model Pan-Tilt Unit-D46-17 by Flir. Connection is made from the pan-tilt unit's RS-232 port to the computer processing unit's USB 2.0 port through an USB to RS232 converter.

The computer processing unit receives, processes and sends information to the camera and pan-tilt unit. The prototype uses a 2.3 GHz Intel® Core™ i7 CPU with a NVIDIA Quadro 4000M graphics card, or graphics processing unit (GPU), connected in a Dell M6600 Precision laptop computer.

Figure 2:
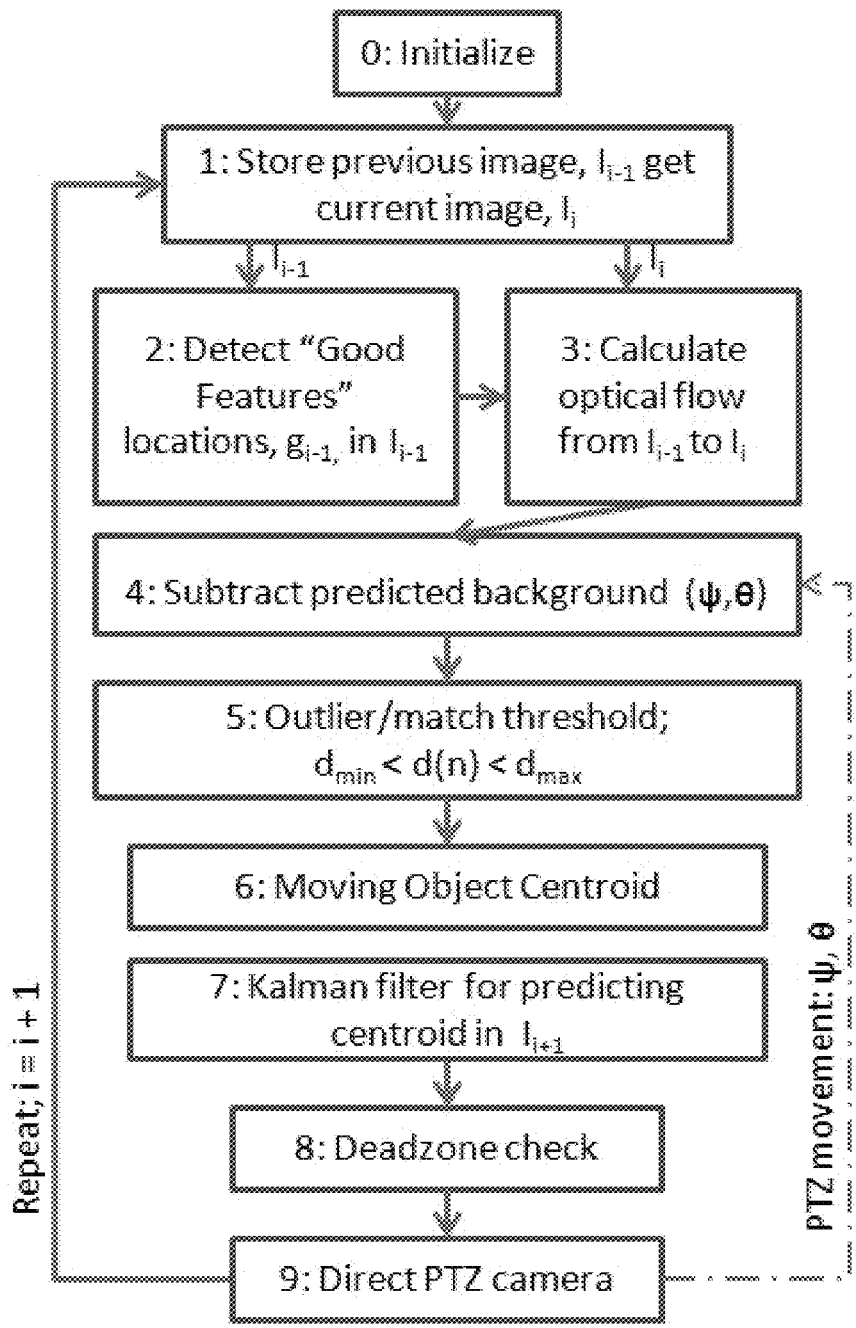
FIG. 2 is a flow chart of the operation of an example embodiment of a method for tracking a moving object according to the teachings of the present invention.

FIG. 2 is a flow chart of the operation of an example embodiment of a method for tracking a moving object according to the teachings of the present invention.

The cycle begins with receiving a new image from a camera. The previous image is processed to find locations of "good features." Good features are areas on an image received from a digital camera having low and high frequency variations at a variety of angles. The locations of 'good features' on the old image are matched to locations on the new image using optical flow. Optical flow matches intensity variation at multiple spatial resolutions to determine the new locations of features. It is distinct from general-purpose feature vectors, such as SIFT or SURF, in that it is much less computationally burdensome, allowing faster processing times while still providing good, general-purpose feature matching. The process of finding good features as optical flow points and matching between images is processed by the GPU.

Using the motion from the previous pan-tilt motion (meaning the motion between the successive two images), a new location is predicted based on geometric optics.

Due to the speed of indoor UASs, cameras must pan and tilt to track the motion, and CV algorithms must run at least at 30 Hz. PTZ cameras have an advantage that the view is not fixed, but the result is that every motion of the camera causes apparent motion of points which are actually static. This apparent motion is termed background motion. This background motion is used to determine actual motion of moving points, termed derived motion. An important element of the teachings of the present invention is a new method for identifying feature points that are actually static along with processing methods for real-time operation as well as GPU-based feature detection and tracking.

Based on a focal length of f and rotations of ψ in pan and θ in tilt, the transform of static points (x,y) would move to (x',y') based on:

$$x' = \frac{x - f\tan(\psi)}{x\tan(\psi)\cos(\theta) - y\frac{\sin(\theta)}{\cos(\psi)} + f\cos(\theta)},$$

$$y' = \frac{x\sin(\psi)\tan(\theta) + y - f\cos(\psi)\tan(\theta)}{x\sin(\psi) - y\tan(\theta) + f\cos(\psi)}$$

The difference between matched new locations from predicted new locations is the actual motion which would be observed by a stationary camera. Matches are classified as background (very little actual motion), moving (reasonable actual motion) or erroneous (unreasonably large observed motion). The location of the moving object is described as the centroid of the moving points and the mean actual motion is used at the object's velocity. A Kalman filter is used to attenuate variation in point distribution and other noise. If the camera must be panned or tilted so that the object will be in the center, then a new commanded direction is sent to the pan-tilt unit. The process will then begin again. After the program initializes, tracking begins once the moving object enters the field of view.

The prototype system is able to track a textured moving object with a cluttered or uncluttered background at frame rates above 15 frames per second. As a general guideline, real-time algorithms typically are slower (2 to 15 frames per second) or faster (15 to 30 frames per second). Only specialized algorithms, such as measuring fluid height or using fiduciaries, run faster. The prototype built according to the teachings of the present invention fits into the range of fast, general image processing algorithms. A specialized pan-tilt unit could easily increase speed to 30 frames per second by simply reducing the pan-tilt processing time to a quarter of its current values by selection of a high speed pan/tilt unit.

Performance, as measured by pixels on an object, is improved by higher resolution of a camera. However, higher resolution images take longer to process. Performance, as measured by allowable speed of the object, is improved by faster processing and movement of the pan-tilt units.

The computer processing unit, including its GPU, computer controlled pan-tilt unit and computer controlled camera are all available as commercial-off-the-shelf products. The interface between the pan-tilt unit and the computer processing unit is via conventional interface ports and drivers.

For clarity, the process is described in a serial fashion. The algorithm can be implemented in a parallel fashion for faster frame rates, at the expense of longer latency. This would be done by processing some commands concurrently based on staggering the data in a pipeline fashion.

The algorithm is described for tracking in two dimensions, but will also apply to tracking in a single dimension such as only needing pan to observe all of a room.

Speed can also be increased by having the computer processing unit and GPU perform calculations during movement of the pan and tilt unit.

Additional information describing the teachings of the present invention, including additional details on how to make and use the invention and best modes, are found in the following references, all of which references include one or more co-inventors of the present invention as author or co-author and all of which are incorporated by reference into this description.

Doyle, Daniel D., Jennings, Alan L., and Black, Jonathan T., "Optical Flow Background Estimation for Real-Time Pan/Tilt Camera Object Tracking," *Measurement*, Volume 48, pp. 15-207 (February 2014).

Doyle, Daniel D. "Real-Time, Multiple, Pan/Tilt/Zoom, Computer Vision Tracking, and 3D Position Estimating System for Small Unmanned Aircraft System Metrology." PhD Dissertation, No. AFIT-ENY-DS-13-D-08, Air Force Institute of Technology (2013).

Doyle, Daniel D., Jennings, Alan L. and Black, Jonathan T., "Optical Flow Background Subtraction for Real-Time PTZ Camera Object Tracking" *Instrumentation and Measurement Technology Conference (I2MTC), 2013 IEEE International* (2013).

Various modifications to the invention as described may be made, as might occur to one with skill in the art of the invention, within the scope of the claims. Therefore, not all contemplated example embodiments have been shown in complete detail. Other embodiments may be developed without departing from the spirit of the invention or from the scope of the claims.

We claim:

1. A computer vision system for tracking a moving object, comprising:
   (a) a pan and tilt unit;
   (b) a digital camera mounted on the pan and tilt unit;
   (c) a programmable computer processing unit, connected to the pan and tilt unit, for controlling panoramic and tilt rotation of the pan and tilt unit such that a received image from the digital camera follows the moving object, wherein the programmable computer processing unit is programmed to successively process received images from the digital camera to:
      (i) detect a first set of optical flow point locations in a first received image;
      (ii) match a second set of optical flow point locations in a second received image to corresponding optical flow point locations in the first received image by an optical flow algorithm;
      (iii) predict locations of the second set of optical flow points based on panoramic and tilt rotation commanded by the programmable computer processing unit from the first received image to the second received image;
      (iv) subtract the predicted locations from the matched second set of optical flow point locations to derive actual background motion of the optical flow points; wherein optical flow points with a derived motion greater than a threshold value are characterized as moving points;
      (v) calculate the location of a moving object as a location among the moving points;
      (vi) command the pan and tilt unit to point the camera at the calculated location of the moving object; and,
      (vii) return to step (c)(i).

2. The computer vision system for tracking a moving object according to claim 1, wherein the optical flow points are determined by locating good features in an image.

3. The computer vision system for tracking a moving object according to claim 1, wherein the location of a moving object in step (c)(v) is calculated as the centroid of the moving points.

4. The computer vision system for tracking a moving object according to claim 1, the digital camera including a lens, wherein the predicted locations of the second set of optical flow points in step (c) (iii) are predicted as the transform of optical flow points (x,y) in the first received image to optical flow points (x',y') in the second received image, based on:

$$x' = \frac{x - f\tan(\psi)}{x\tan(\psi)\cos(\theta) - y\frac{\sin(\theta)}{\cos(\psi)} + f\cos(\theta)};$$

and, $$y' = \frac{x\sin(\psi)\tan(\theta) + y - f\cos(\psi)\tan(\theta)}{x\sin(\psi) - y\tan(\theta) + f\cos(\psi)};$$

where f is the focal length of the lens, $\psi$ the angle of commanded panoramic rotation and $\theta$ the angle of commanded tilt rotation.

5. A programmable computer processor implemented computer vision method for tracking a moving object using a digital camera, including a lens, mounted on a pan and tilt unit, and a programmable computer processing unit, comprising the steps of:
  (a) detecting a first set of optical flow point locations in a first received image;
  (b) matching a second set of optical flow point locations in a second received image to corresponding optical flow point locations in the first received image by an optical flow algorithm;
  (c) predicting locations of the second set of optical flow points based on panoramic and tilt rotation commanded by the programmable computer processing unit from the first received image to the second received image;
  (d) subtracting the predicted locations from the matched second set of optical flow point locations to derive actual background motion of the optical flow points; wherein optical flow points with a derived motion greater than a threshold value are characterized as moving points;
  (e) calculating the location of a moving object as a location among the moving points;
  (f) commanding the pan and tilt unit to point the camera at the calculated location of the moving object; and,
  (g) returning to step (a).

6. The computer vision method for tracking a moving object according to claim 5, wherein the optical flow points are determined by locating good features in an image.

7. The computer vision method for tracking a moving object according to claim 5, wherein the location of a moving object in step (e) is calculated as the centroid of the moving points.

8. The computer vision method for tracking a moving object according to claim 5, wherein the predicted locations of the second set of optical flow points in step (c) are predicted as the transform of optical flow points (x,y) in the first received image to optical flow points (x',y') in the second received image, based on:

$$x' = \frac{x - f\tan(\psi)}{x\tan(\psi)\cos(\theta) - y\frac{\sin(\theta)}{\cos(\psi)} + f\cos(\theta)};$$

and, $$y' = \frac{x\sin(\psi)\tan(\theta) + y - f\cos(\psi)\tan(\theta)}{x\sin(\psi) - y\tan(\theta) + f\cos(\psi)};$$

where f is the focal length of the lens, $\psi$ the angle of commanded panoramic rotation and $\theta$ the angle of commanded tilt rotation.

* * * * *